US010999780B2

(12) United States Patent
Bradley et al.

(10) Patent No.: US 10,999,780 B2
(45) Date of Patent: May 4, 2021

(54) BLUETOOTH TRIGGER FOR NAN

(71) Applicant: Apple Inc., Cupertino, CA (US)

(72) Inventors: Bob Bradley, San Jose, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 16/190,304

(22) Filed: Nov. 14, 2018

(65) Prior Publication Data

US 2019/0150062 A1 May 16, 2019

Related U.S. Application Data

(60) Provisional application No. 62/586,772, filed on Nov. 15, 2017.

(51) Int. Cl.
| | |
|---|---|
| *H04L 29/08* | (2006.01) |
| *H04W 8/00* | (2009.01) |
| *H04W 84/12* | (2009.01) |
| *H04W 48/18* | (2009.01) |
| *H04W 88/06* | (2009.01) |
| *H04W 48/08* | (2009.01) |
| *H04W 4/80* | (2018.01) |

(52) U.S. Cl.
CPC ............ *H04W 48/08* (2013.01); *H04L 67/16* (2013.01); *H04W 4/80* (2018.02); *H04W 8/005* (2013.01); *H04W 48/18* (2013.01); *H04W 84/12* (2013.01); *H04W 88/06* (2013.01)

(58) Field of Classification Search
CPC .. H04L 1/1621; H04L 5/0055; H04W 72/042; H04W 72/044; H04W 48/08; G06F 3/064
See application file for complete search history.

(56) References Cited

U.S. PATENT DOCUMENTS

| | | | |
|---|---|---|---|
| 8,170,481 B2 | 5/2012 | Rangarajan | |
| 8,886,118 B2 | 11/2014 | Reuss | |
| 9,179,305 B2 | 11/2015 | Haddad | |
| 2014/0211659 A1* | 7/2014 | Abraham | H04W 52/0209 370/254 |
| 2016/0174134 A1 | 6/2016 | Srinivasa Gopalan | |
| 2017/0164186 A1 | 6/2017 | Yong | |
| 2018/0359642 A1* | 12/2018 | Torvinen | H04L 63/123 |
| 2019/0349426 A1* | 11/2019 | Smith | H04L 67/104 |

* cited by examiner

*Primary Examiner* — Iqbal Zaidi
(74) *Attorney, Agent, or Firm* — Kowert, Hood, Munyon, Rankin & Goetzel, P.C.

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for a device to trigger, via a first interface, service discovery over a second interface. In some embodiments, the service discovery can involve the exchange of one or more Bloom filters.

20 Claims, 13 Drawing Sheets

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

*FIG. 4A*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

*FIG. 4B*

| Attributes | NAN SDF Frames |||||
|---|---|---|---|---|---|
| | Publish ||| Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

*FIG. 4C*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

*FIG. 4D*

| AD Length | TDD AD Type | Org. ID | TDS Flag | Transport Data Length | Transport Data |
|---|---|---|---|---|---|
| (1 byte) | (1 byte) | (1 byte) | (1 byte) | (1 byte) | (0-26 bytes) |

FIG. 5A
*(Prior Art)*

| Org. ID | |
|---|---|
| Value | Definition |
| 0x00 | RFU |
| 0x01 | BT SIG |
| 0x02-0xFF | BT SIG assigned number for Org use |

FIG. 5B
*(Prior Art)*

| TDS Flag | |
|---|---|
| TDS Flag Bits | TDS Flag Definition |
| B0-B1 | Frame Roles:<br>0b00: Not Specified<br>0b01: Seeker Only<br>0b10: Provider Only<br>0b11: Both Seeker and Provider |
| B2 | Transport Data Incomplete:<br>0: False<br>1: True (more data in GATT database) |
| B3-B4 | Transport State:<br>0b00: Off<br>0b01: On and Available<br>0b10: On and Temporarily Unavailable<br>0b11: Reserved for future use |
| B5-B7 | Reserved for future use |

FIG. 5C
(Prior Art)

| AD Length | TDD AD Type | Org. ID | TDS Flag | Transport Data Length | Bloom Filter |
|---|---|---|---|---|---|
| (1 byte) | (1 byte) | (1 byte) | (1 byte) | (1 byte) | (≥ 8 bytes) |

*FIG. 6A*

| Org. ID | |
|---|---|
| Value | Definition |
| 0x00 | RFU |
| 0x01 | BT SIG |
| 0x02 | WFA |
| 0x03-0xFF | BT SIG assigned number for Org use |

*FIG. 6B*

BLUETOOTH TRIGGER FOR NAN

PRIORITY DATA

This application claims benefit of priority to U.S. Provisional Application Ser. No. 62/586,772, titled "Bluetooth Trigger for NAN", filed Nov. 15, 2017, by Bob Bradley, Su Khiong Yong, and Yong Liu, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to trigger service discovery over a first interface via service advertisement over a second interface.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to discover services available over a higher powered interface (e.g., as compared to other available interfaces of the wireless stations) via exchange of messages over a lower powered interface (e.g., as compared to other available interfaces of the wireless stations).

In some embodiments, the communications may be performed via a peer-to-peer wireless communications protocol such as Neighbor Awareness Networking (NAN). Thus, embodiments of the disclosure also relate to a NAN device discovering NAN services over a lower powered interface, such as a Bluetooth or Bluetooth Low Energy interface.

In some embodiments, a wireless station may be configured to perform a method to transmit, via a first wireless interface, a first message that includes a first Bloom filter that may indicate at least one service sought via a second wireless interface. The wireless station may receive, via the first wireless interface, a second message from a neighboring wireless station that may include a second Bloom filter that may indicate at least one service provided by the neighboring wireless station via the second wireless interface. The wireless station may scan the second Bloom filter to determine a match between the at least one service sought and the at least one service provided. In response to determining the match, the wireless station may transmit a third message, via the first wireless interface, that may include a third Bloom filter that may indicate a request to connect to the at least one service provided. In some embodiments, the wireless station may receive a fourth message, via the first wireless interface, that may include a fourth Bloom filter that may indicate acceptance of the request to connect to the at least one service provided. In some embodiments, in response to receiving the fourth message, the wireless station may activate the second wireless interface and may perform service discovery with the neighboring wireless station via the second wireless interface. In some embodiments, two or more of the first, second, third, and fourth Bloom filter may be identical (e.g., the same).

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments, FIG. 4D illustrates an example format of an action frame, according to some embodiments.

FIG. 5A illustrates an example format of a TDS packet.

FIG. 5B illustrates an example format of an organization data field of a TDS packet.

FIG. 5C illustrates an example format of a TDS flag field of a TDS packet.

FIG. 6A illustrates an example format of a TDS packet, according to embodiments.

FIG. 6B illustrates an example format of an organization data field of a TDS packet, according to some embodiments.

Figure 1:
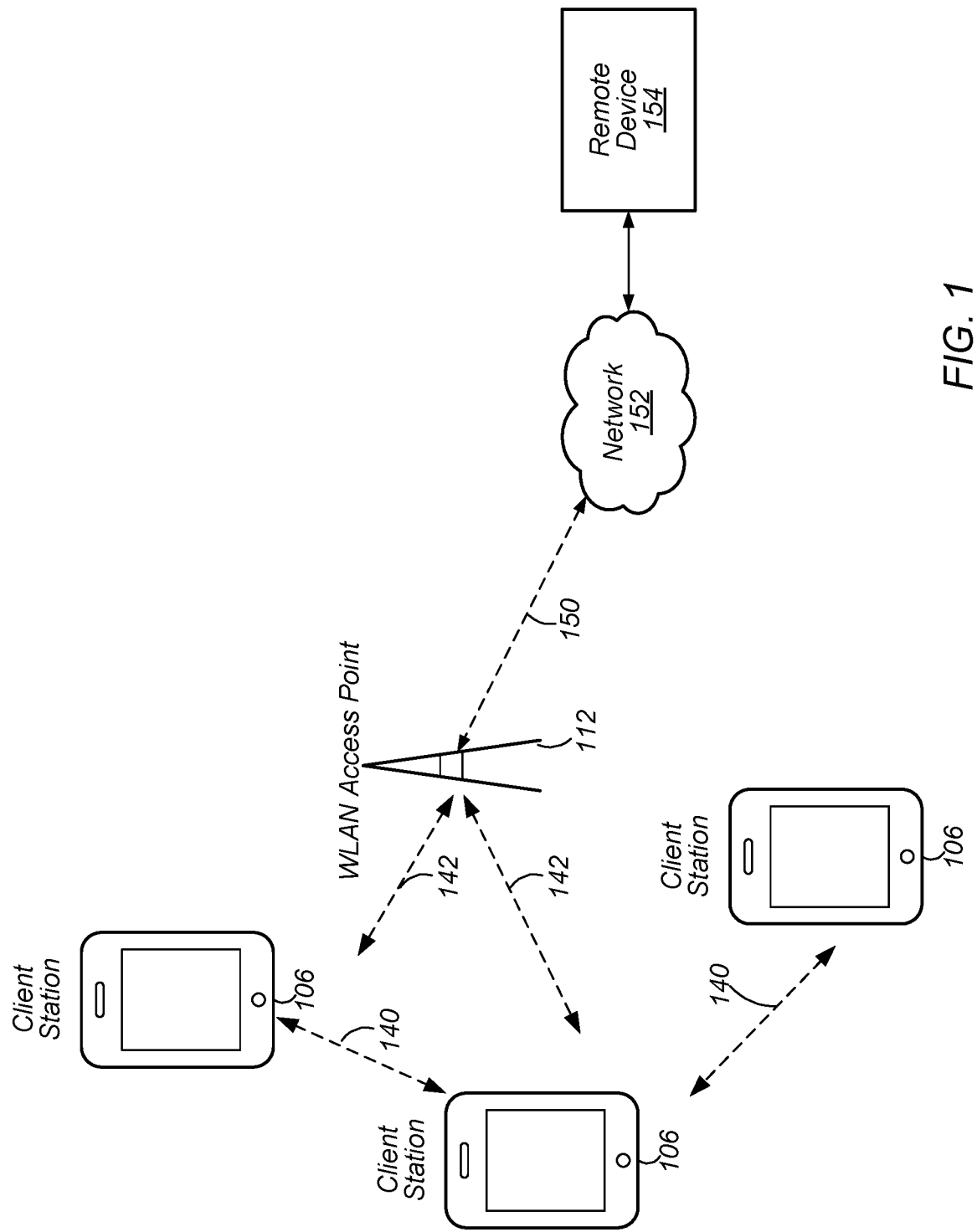
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, via a first wireless interface, a first message that includes a first Bloom filter that may indicate at least one service sought via a second wireless interface. The wireless device 106 may receive, via the first wireless interface, a second message from a neighboring wireless device 106 that may include a second Bloom filter that may indicate at least one service provided by the neighboring wireless device 106 via the second wireless interface. The wireless device 106 may scan the second Bloom filter to determine a match between the at least one service sought and the at least one service provided. In response to determining the match, the wireless device 106 may transmit a third message, via the first wireless interface, that may include a third Bloom filter that may indicate a request to connect to the at least one service provided. The wireless device 106 may receive a fourth message, via the first wireless interface, that may include a fourth Bloom filter that may indicate acceptance of the request to connect to the at least one service provided. In some embodiments, in response to receiving the fourth message, the wireless device 106 may activate the second wireless interface and may perform service discovery with the neighboring wireless device 106 via the second wireless interface.

Figure 2:
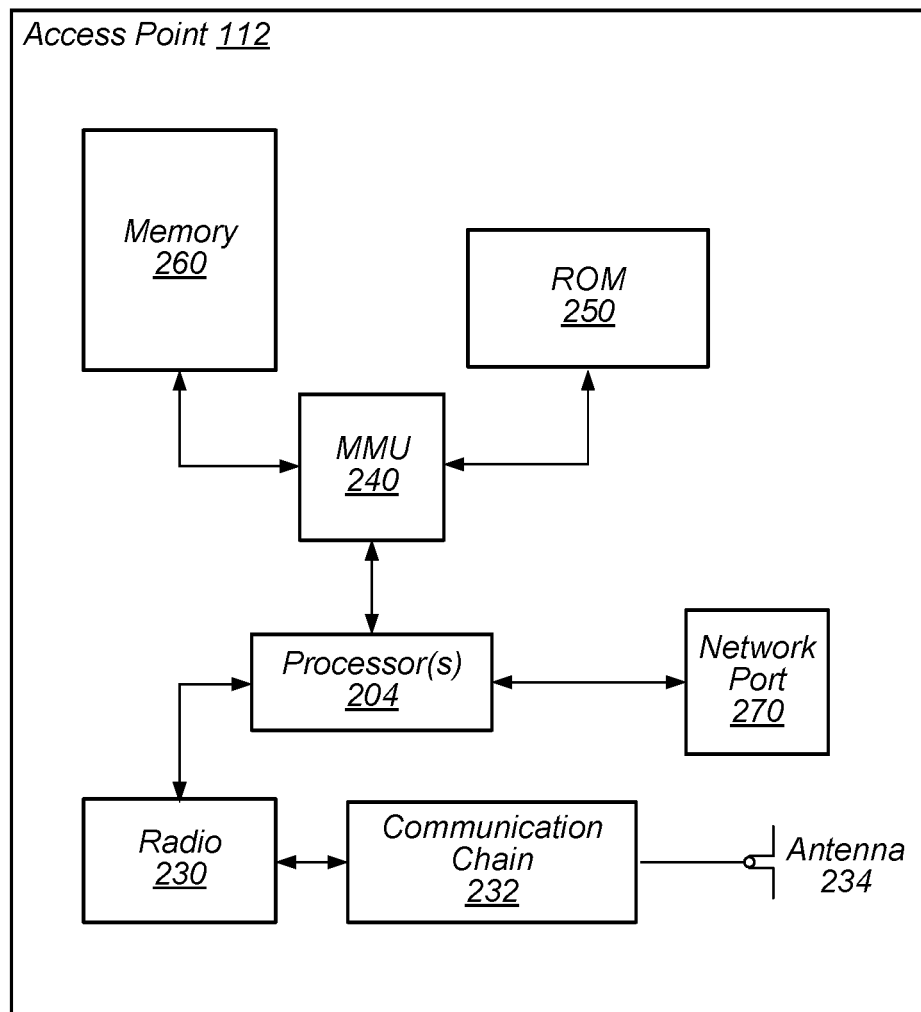
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 that may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to transmit, via a first wireless interface, a first message that includes a first Bloom filter that may indicate at least one service sought via a second wireless interface. The AP 112 may receive, via the first wireless interface, a second message from a neighboring AP 112 that may include a second Bloom filter that may indicate at least one service provided by the neighboring AP 112 via the second wireless interface. The AP 112 may scan the second Bloom filter to determine a match between the at least one service sought and the at least one service provided. In response to determining the match, the AP 112 may transmit a third message, via the first wireless interface, that may include a third Bloom filter that may indicate a request to connect to the at least one service provided. The AP 112 may receive a fourth message, via the first wireless interface, that may include a fourth Bloom filter that may indicate acceptance of the request to connect to the at least one service provided. In some embodiments, in response to receiving the fourth message, the AP 112 may activate the second wireless interface and may perform service discovery with the neighboring AP 112 via the second wireless interface.

Figure 3:
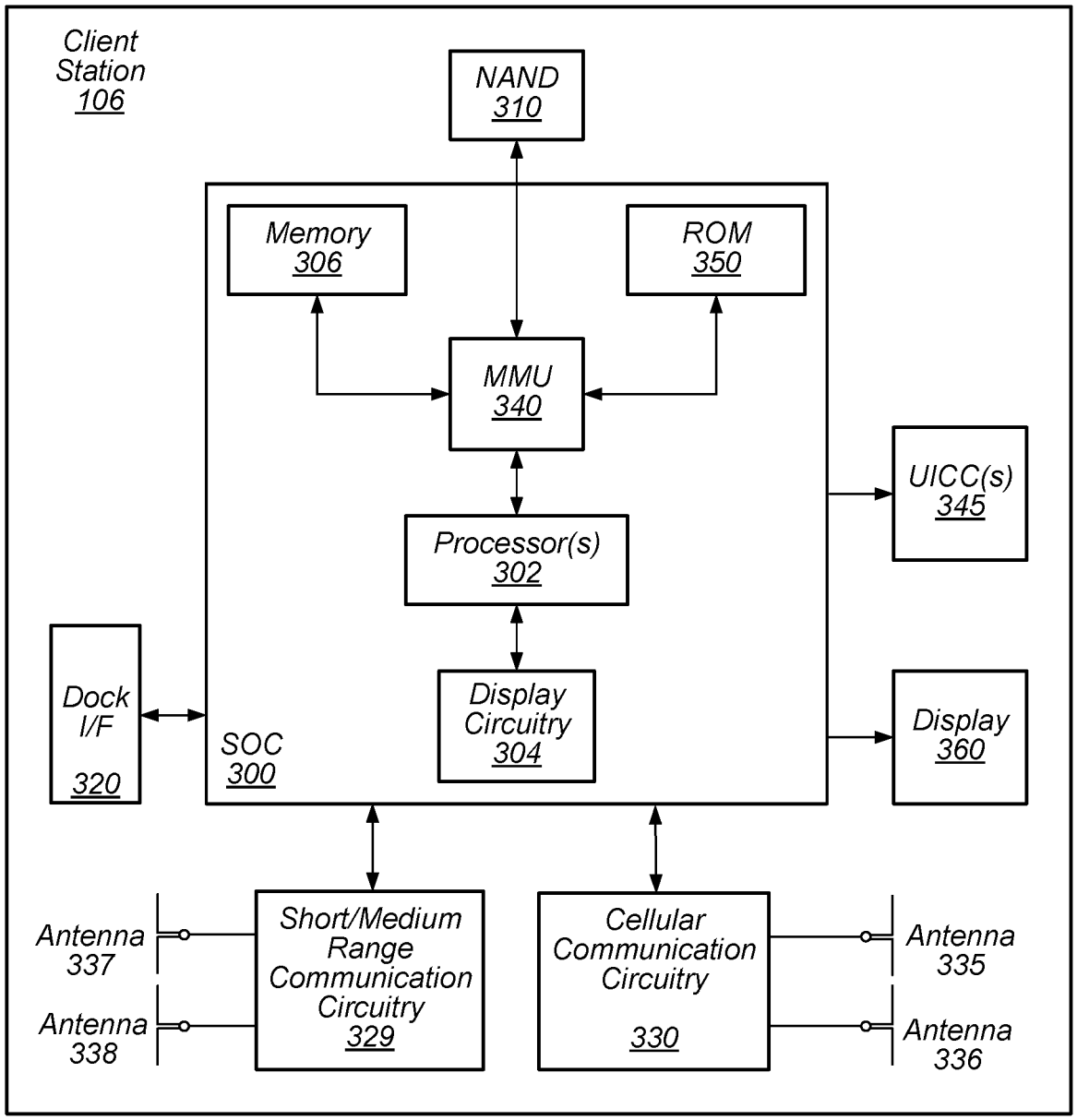
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to transmit, via a first wireless interface, a first message that includes a first Bloom filter that may indicate at least one service sought via a second wireless interface. The client station 106 may receive, via the first wireless interface, a second message from a neighboring client station 106 that may include a second Bloom filter that may indicate at least one service provided by the neighboring client station 106 via the second wireless interface. The client station 106 may scan the second Bloom filter to determine a match between the at least one service sought and the at least one service provided. In response to determining the match, the client station 106 may transmit a third message, via the first wireless interface, that may include a third Bloom filter that may indicate a request to connect to the at least one service provided. The client station 106 may receive a fourth message, via the first wireless interface, that may include a fourth Bloom filter that may indicate acceptance of the request to connect to the at least one service provided. In some embodiments, in response to receiving the fourth message, the client station 106 may activate the second wireless interface and may perform service discovery with the neighboring client station 106 via the second wireless interface.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information (e.g., per NAN 2.0). The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to advertise and/or seek services available over a higher power interface via a lower power interface. In other words, a lower power interface may be used to exchange message to trigger discovery of a service available over a higher power interface.

BLE Triggering Service over NAN

In some implementations, Bluetooth Low Energy (BTLE or BLE) provides a transport discovery service (TDS) mechanism for service discovery over BLE. In particular, TDS implements a packet format that provides a generic container (e.g., a data structure) via an organization data attribute or field. The organization data attribute (field) may be limited (or constrained) to 26 bytes of data in existing implementations. As illustrated by FIG. 5A, the TDS packet format may include 1 byte for an AD length field, 1 byte for a transport discovery data AD type code, 1 byte for organization identifier (or identity) (org. ID), 1 byte for a TDS flag, 1 byte for transport data length, and up to 26 bytes for organization data. The transport discovery data AD type code may be set to TDD AD type code, the org. ID field (or attribute), as further illustrated by FIG. 5B, may be set to 0x00 for RFU, 0x01 for Bluetooth special interest group (SIG), and the remaining values of 0x02 to 0xFF may be reserved for Bluetooth SIG assigned number for organization usage. As illustrated by FIG. 5C, the TDS flag field (or attribute) may include bits for frame role, transport data incomplete, and transport state. In particular, the transport state may be specified by 2 bits (e.g., bits 3-4 of the TDS flag) with 0b00 indicating transport state is off, 0b01 indicating that an interface is on and available, 0b10 indicating that an interface is on and temporality unavailable, and 0b11 reserved. In addition, bits of the TDS flag field may be reserved (e.g., bits B5-B7).

Embodiments described herein provide a mechanism for a wireless device to implement a TDS format for discovering services and activating other transports via Bluetooth TDS. In some embodiments, as illustrated by FIG. 6A, a TDS format for triggering other transports (e.g., Wi-Fi Direct, NAN, Infrastructure, and so forth) may include 1 byte for an AD length field, 1 byte for a transport discovery data AD type code, 1 byte for organization identifier (or identity) (org. ID), 1 byte for a TDS flag, 1 byte for transport data length, and an at least 8 byte Bloom filter. Note that in accordance with existing implementations, the Bloom filter may be limited to no more than 26 bytes, however, larger Bloom filters are envisioned within the scope of this disclosure. In some embodiments, as illustrated by FIG. 6B, the org. ID field (or attribute) may be set to 0x00 for RFU, 0x01 for Bluetooth special interest group (SIG), 0x02 for Wi-Fi Alliance, and the remaining values of 0x03 to 0xFF may be reserved for Bluetooth SIG assigned number for organization usage.

In some embodiments, a Bloom filter field may be greater than 64 bits and may contain a set of bit positions that are set to "1" after hashing elements by the Bloom filter. In some embodiments, an element which may include a service type, a link identifier, and/or a type of operation may be defined using a standardized syntax such as <operation>[; <operation parameters]:<service type>%<Suffix/link identifier>. In some embodiments, an operation, e.g., as denoted by syntax "<operation>[; <operation parameters]" may include any of a device specific notification, e.g., "d;<BD ADDR>:", a provider of a service, e.g., "p:", and/or a seeker of a service, e.g., "s:". In some embodiments, for example, a device-specific notification "<BD ADDR>" may use lowercase hex digits with a format of "xx:xx:xx:xx:xx:xx". The BD ADDR may be an address in an advertisement packet and not a secret address used to derive the address. In some embodiments, such a device specific notification may be advertised by a seeker of a service when the seeker wants to bring up (e.g., activate) a link on a device associated with the address. In some embodiments, the provider of a service may respond with "p:" syntax when the provider receives an advertisement from a seeker that matches a service provided by the provider. In addition, a seeker may also match against this "p:" syntax to determine if an advertisement from a provider is for a service sought by the seeker. In some embodiments, the seeker of a service may advertise with "s:" syntax to indicate that the seeker is seeking a service specified by the syntax. In addition, a provider may also match against this "s:' syntax to determine if an advertisement from a seeker is for a service provided by the provider.

In some embodiments, a <service type> may be found in the Service Name and Transport Protocol Port Number registry (e.g., see http://www.iana.org/assignments/service-names-port-numbers/service-names-port-numbers.xhtml for example service names and ports). The registry is managed by the Internet Assigned Numbers Authority (IANA) and RFC 6335 defines procedures that the IANA uses when handling assignment and other requests related to the registry. For example, an internet printing protocol may be associated with a service type "_ipp_tcp" and a printer service may be associated with a service type "_printer_". In other words, in some embodiments, services hashed by a Bloom filter as described above may conform to naming rules specified in Section 5 of RFC-6335 with an additional prefix for the type of operation being performed (e.g. seeking and/or providing) and a suffix for the type of link. In addition, the string may be lowercase and may not include a trailing dot. In some embodiments, prefixes and suffixes may aid in avoidance of false positives when a device is performing multiple operations at once (e.g. seeking and providing). For example, if a device is providing an Airdrop service (e.g., "airdrop.tcp") and also seeking another Airdrop service, the prefixes and suffixes may allow the Airdrop services to be distinguished.

In some embodiments, a <Suffix/link identifier> may be a generic link identifier syntax that may represent a specific wireless technology. For example, "% nan" may represent Wi-Fi Aware (e.g., Neighbor Awareness Networking (NAN) peer-to-peer Wi-Fi link), "% p2p" may represent Wi-Fi Direct, "%60 ghz" may represent WiGig, "% iwifi" may represent Infrastructure Wi-Fi, "% halow" may represent Wi-Fi Halow, "% awdl" may represent Apple Wireless Direct Link (e.g., a peer-to-peer Wi-Fi link), "% btc" may represent Bluetooth classic (e.g., such an identifier may allow a lower power BLE link to activate (bring up) a higher performance (e.g., higher power) link), and so forth.

In some embodiments, the above described generic syntax may allow a mechanism for any service type, link identifier, and operation to be represented through a Bloom filter. For example, for a seeker to discover a printer (e.g., "printer._tcp") available over a NAN interface, the seeker may advertise (e.g., via the Bloom filter included in a TDS packet) "s:_printer._tcp % nan". Similarly, a provider may advertise (or respond to a seeker) a service for a printer available over a NAN interface by including "p:_printer._tcp % nan" in a Bloom filter included in a TDS packet. As a further example, a provider that advertised a print service available over a NAN interface from a Bluetooth device address of 11:22:33:aa:bb:cc may be contacted by a seeker by inclusion of the provider's Bluetooth device address in a device specific notification of "d;11:22:33:aa:bb:cc:_printer._tcp % nan".

As another example, for a seeker to discover an internet printing protocol service available over a NAN interface, the seeker may advertise (e.g., via the Bloom filter included in a TDS packet) "s:_ipp._tcp % nan." Similarly, a provider may advertise (or respond to a seeker) a service for an internet printing protocol service available over a NAN interface by including "p:_ipp._tcp % nan" in a Bloom filter included in a TDS packet. As a further example, a provider that advertised an internet printing protocol service available over a NAN interface from a Bluetooth device address of 11:22:33:aa:bb:cc may be contacted by a seeker by inclusion of the provider's Bluetooth device address in a device specific notification of "d;11:22:33:aa:bb:cc:_ipp._tcp % nan".

At noted above, in some embodiments, a Bloom filter may be a minimum of 8 bytes. In some embodiments, as noted, the Bloom filter size may be restricted to 26 bytes based on current implementations of TDS packets. However, larger Bloom filter sizes are within the scope of this disclosure. In other words, embodiments described herein do not restrict maximum size of the Bloom filter. Thus, in some embodiments, size of the Bloom filter may be determined based on implementation and/or deployment. In some embodiments, a device (e.g., such as wireless station 106) may configure a size of a Bloom filter based, at least in part, on a number of elements (e.g., combinations of number of services, number of interfaces, and/or type of operations). and/or a probability of a false positive match. For example, a device acting as an advertiser (provider) with two services and one interface may use an 8 byte Bloom filter (e.g., with a sufficiently low probability of a false positive match). As another example, a device acting as both subscriber (seeker) and advertiser (provider) with eight services and four interfaces may use a 26 byte Bloom filter (e.g., with a sufficiently low probability of a false positive match).

It should be noted that a Bloom filter is a probabilistic data structure. Thus, if "correct" bits are not used to describe a service (e.g., set), then it may be determined that the service is definitively not present in the Bloom filter. However, if "correct" bits are used to describe the service (e.g., set), then the service may be present, but the service may also be a false positive. Note that a probability of a false positive increases with the number of services for a given size of a Bloom filter. For example, for an 8 byte (64 bit) Bloom filter, estimated false positives for a given number of services may be 0.000% for 1 service, 0.006% for 2 services, 0.040% for 3 services, 0.139% for 4 services, 0.354% for 5 services, 0.734% for 6 services, 1.326% for 7 services, 2.168% for 8 services, 3.283% for 9 services, and 4.685% for 10 services.

Similarly, a probability of a false positive decreases as size of a Bloom filter increase for a given number of services. Note that a Bloom filter may not use "pad" or "fill" bits, in some embodiments.

In some embodiments, a Bloom filter may be generated using a commercially available hash generator. For example, in some embodiments, SipHash may be used to generate the Bloom filter. In some embodiments a fixed key of <00 00 00 00 00 00 00 00 00 00 00 00 00 00 00 01> and a hash count of 5 may be used to generate the Bloom filter. For example, SipHash may generate a 64-bit hash such that a single invocation provides enough for all 5 hashes. In such embodiments, a first bit index may use the 64-bit SipHash result mod <bitCount> and then, to generate subsequent bit indexes, a previous bit index may be divided by <bitCount> and mod'd with <bitCount>. In some embodiments, a receiver of the Bloom filter may decode a size of the Bloom filter via a length field and use the size to generate a Bloom filter of similar size in order to perform service matching. In some embodiments, a receiver of the Bloom filter may generate multiple Bloom filters of various sizes in order to perform service matching.

Figure 7:
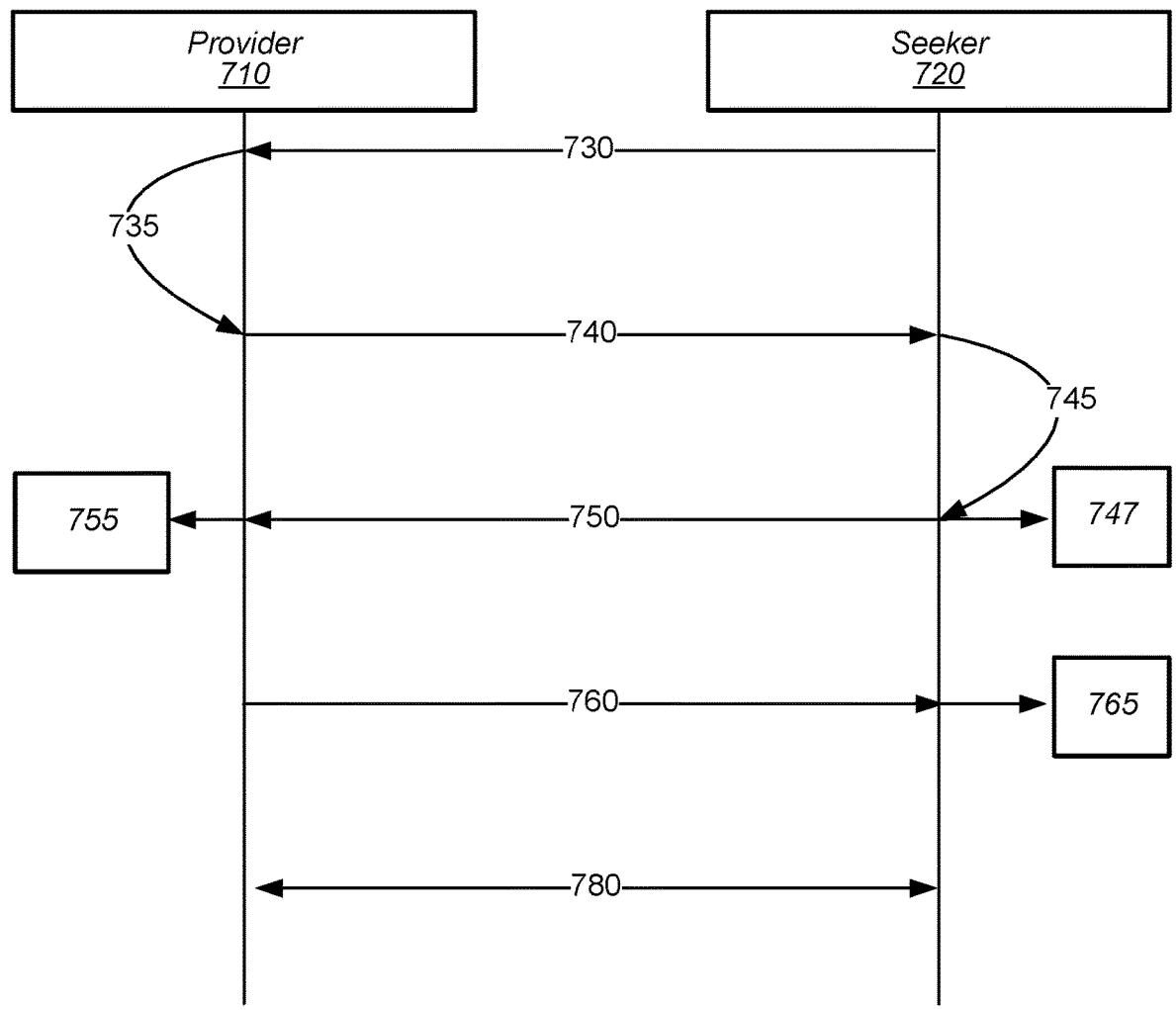
FIG. 7 illustrates a signaling diagram of an example of a protocol for a generic BLE triggering of service discovery over another (e.g., higher power) wireless interface, according to some embodiments.

FIG. 7 illustrates a signaling diagram of an example of a protocol for a generic BLE triggering of service discovery over another (e.g., higher power) wireless interface, according to some embodiments. The signaling shown in FIG. 7 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this protocol may operate as follows.

In some embodiments, a seeker 720, which may be a wireless station such as wireless station 106 described above, may transmit a first TDS packet 730 over a Bluetooth interface to a provider 710, which may also be a wireless station, such as wireless station 106. The first TDS packet 730 may include a Bloom filter that includes a hash of a syntax to search for a service available over another (e.g., higher power) wireless interface, such as NAN, Apple Wireless Direct Link (AWDL), Wi-Fi Direct, Infrastructure Wi-Fi, and so forth. For example, the Bloom filter may include a hash of a syntax "s:_ipp._tcp % nan". Thus, the syntax may indicate that the sender of the TDS packet (e.g., the seeker 720) may be in search of an internet printing protocol service available over a NAN interface. In addition, the seeker 720 may be associated with (or have) an address (e.g., a Bluetooth address), e.g., such as 44:55:66:dd:ee:ff. Note that in some embodiments, the Bloom filter may include additional services sought and/or provided by the seeker. In some embodiments, the seeker 720 may use multiple TDS blocks to advertise services sought/provided, e.g., a first TDS block to advertise services sought and a second TDS block to advertise services provided.

The provider 710 may receive the first TDS packet 730 from the seeker and may scan the included Bloom filter for a service match at 735. In some embodiments, in response to a service match, the provider 710 may transmit a second TDS packet 740 over a Bluetooth interface to the seeker 720. The second TDS packet 740 may include a Bloom filter that includes a hash of a syntax to indicate a service provided over another (e.g., higher power) wireless interface, such as NAN, Apple Wireless Direct Link (AWDL), Wi-Fi Direct, Infrastructure Wi-Fi, and so forth. For example, the Bloom filter may include a hash of a syntax "p:_ipp._tcp % nan". Thus, the syntax may indicate that the sender of the TDS packet (e.g., the provider 710) may be providing an internet printing protocol service available over a NAN interface. In addition, the provider 710 may be associated with (or have) an address (e.g., a Bluetooth address), e.g., such as 11:22:33:aa:bb:cc. In some embodiments, the provider may only include the service matched in the Bloom filter.

The seeker 720 may receive the second TDS packet 740 from the provider 710 and may scan the included Bloom filter for a service match at 745. In addition, in some embodiments, the seeker 720 may also resolve a Bluetooth address of the provider 710. In some embodiments, in response to the service match at 745, the seeker 720 may perform one or more functions at 747, such as display of icons indicative of the service match, display of additional information related to the service match such as user name, device name, and so forth. In addition, the seeker 720, in response to the service match at 745, may transmit a third TDS packet 750 to the provider 710 indicating a request to connect. The third TDS packet 750 may include a Bloom filter that includes a hash of syntax to indicate the request to connect to a specific device, e.g. a device with an address as 11:22:33:aa:bb:cc. For example, the Bloom filter may include a hash of a syntax such as "d;11:22:33:aa:bb:cc:_ipp._tcp % nan".

In some embodiments, in response to the service match at 745, the seeker 720 may activate a NAN interface at 747 and may transmit a third TDS packet 750 to the provider 710 indicating a request to connect. The provider 710 may receive the third TDS packet 750 indicating the request to connect from the seeker 720 and, upon decoding the Bloom filter with a match, the provider 710 may activate a NAN interface at 755. After both devices have activated NAN interfaces (e.g., at 747 and 755), the devices may proceed with NAN service discovery 780. Note that the provider 710 may not need to transmit the fourth TDS packet 760.

The provider 710 may receive the third TDS packet 750 indicating the request to connect from the seeker 720. In addition, upon decoding the Bloom filter with a match, the provider may activate a NAN interface at 755 and transmit to the seeker 720 a fourth TDS packet 760 indicating the request to connect has been accepted. The fourth TDS packet 760 may include a Bloom filter that includes a hash of a syntax to indicate the acceptance of the request to connect from the device with address as 44:55:66:dd:ee:ff. For example, the Bloom filter may include a hash of a syntax such as "d;44:55:66:dd:ee:ff:_ipp._tcp % nan".

In response to receiving the fourth TDS packet 760 indicating that the request to connect has been accepted by the provider 710, the seeker 760 may activate a NAN interface at 765. After both devices have activated NAN interfaces (e.g., at 755 and 765), the devices may proceed with NAN service discovery 780.

Note that although the above example signal flow represented triggering of a NAN interface via exchange of TDS packets over a Bluetooth interface, other embodiments are envisioned. For example, another lower power interface, such as Zigbee and/or Ultra wideband (UWB) radio may be used as a primary interface to trigger a secondary (e.g., higher power) interface, such as NAN. In addition, in some embodiments, unused space in a TDS packet organization data field (currently specified as up to 26 bytes) may be used to carry information to enable faster discovery for the secondary interface. For example, the unused space may carry information regarding channel information, medium access control (MAC) address, randomized MAC address, secondary radio specific information, and so forth.

Figure 8:
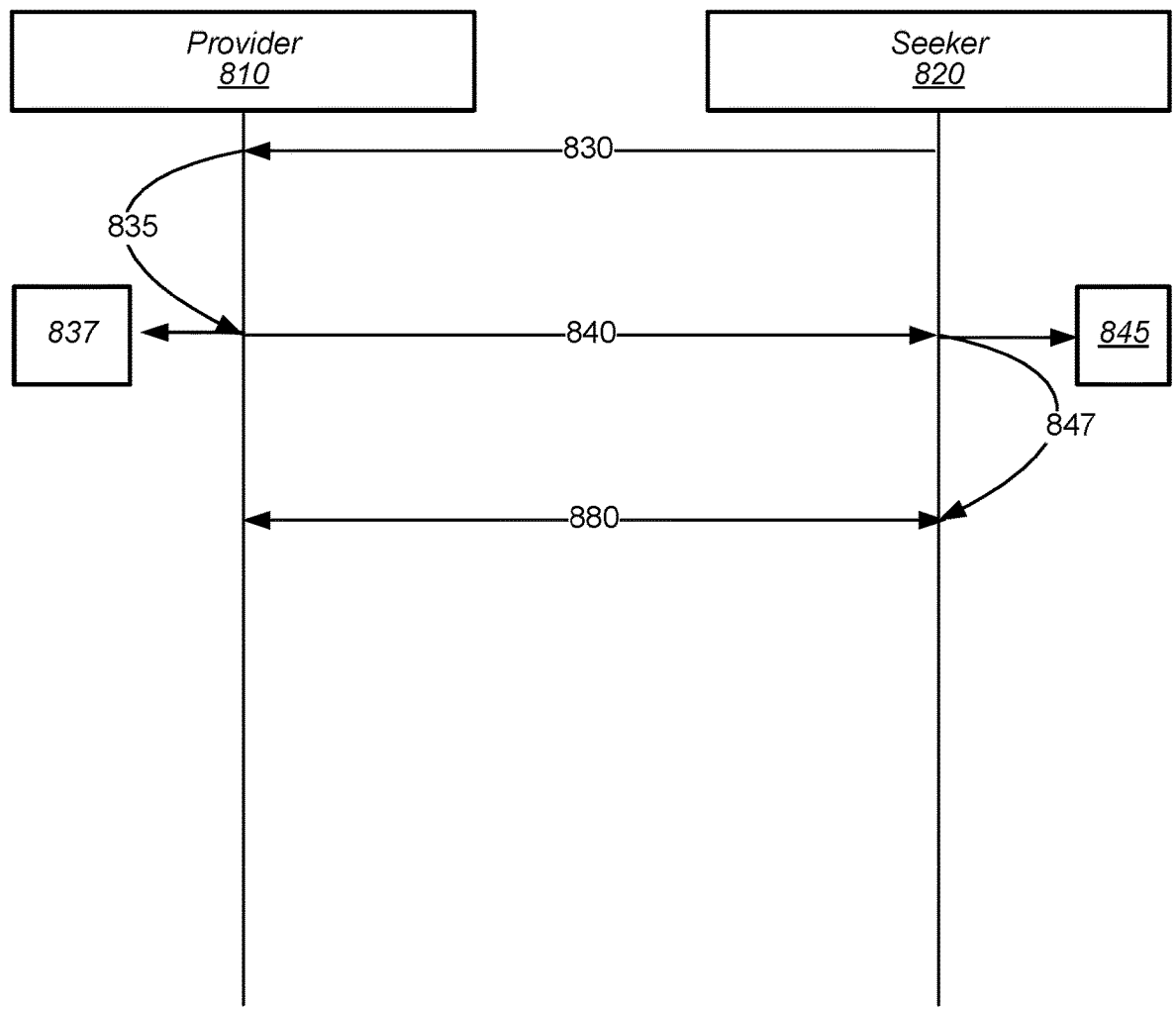
FIG. 8 illustrates a signaling diagram of an example of a compact protocol for a generic BLE triggering of service discovery over another (e.g., higher power) wireless interface, according to some embodiments.

In some embodiments, instead of the 4 message handshake described above, a more compact triggering may enable a 2 message handshake to trigger a secondary radio interface. FIG. 8 illustrates a signaling diagram of an example of a compact protocol for a generic BLE triggering of service discovery over another (e.g., higher power) wireless interface, according to some embodiments. The signaling shown in FIG. 8 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this protocol may operate as follows.

In some embodiments, a seeker 820, which may be a wireless station such as wireless station 106 described above, may transmit a first TDS packet 830 over a Bluetooth interface to a provider 810, which may also be a wireless station, such as wireless station 106. The first TDS packet 830 may include a Bloom filter that includes a hash of a syntax to search for a service available over another (e.g., higher power) wireless interface, such as NAN, Apple Wireless Direct Link, Wi-Fi Direct, Infrastructure Wi-Fi, and so forth. For example, the Bloom filter may include a hash of a syntax "s:_ipp._tcp % nan". Thus, the syntax may indicate that the sender of the TDS packet (e.g., the seeker 820) may be in search of an internet printing protocol service available over a NAN interface. In some embodiments, the Bloom filter may include a hash of a syntax "b:_ipp._tcp % nan" to indicate the TDS discovery using the compact protocol. In addition, the seeker 820 may be associated with (or have) an address (e.g., a Bluetooth address), e.g., such as 44:55:66:dd:ee:ff. Note that in some embodiments, the Bloom filter may include additional services sought and/or provided by the seeker. In some embodiments, the seeker 820 may use multiple TDS blocks to advertise services sought/provided, e.g., a first TDS block to advertise services sought and a second TDS block to advertise services provided.

The provider 810 may receive the first TDS packet 830 from the seeker 820 and may scan the included Bloom filter for a service match at 835. In some embodiments, in response to a service match, and in anticipation of service discovery using the compact protocol, the provider 810 may also activate a secondary wireless interface at 837. Further, the provider 810 may transmit a second TDS packet 840 over a Bluetooth interface to the seeker 820. The second TDS packet 840 may include all services (or a plurality of services) offered by the provider 810. For example, the second TDS packet 840 may include a Bloom filter that includes a hash of a syntax to indicate all services (or a plurality of services) that the provider 810 may provide over another (e.g., higher power) wireless interface, such as NAN, Apple Wireless Direct Link (AWDL), Wi-Fi Direct, Infrastructure Wi-Fi, and so forth.

Further, upon receiving the reply (e.g., second TDS packet 840) from the provider 810, the seeker 820 may determine a service match at 847 and activate its secondary wireless interface at 845. Note that in such embodiments, the probability of false positives may be increase due to the increased number of services included in the Bloom filter. Additionally, after both devices have activated higher power wireless interfaces (e.g., such as NAN, AWDL, Wi-Fi direct, and so forth), the devices may proceed with service discovery 880.

Figure 9:
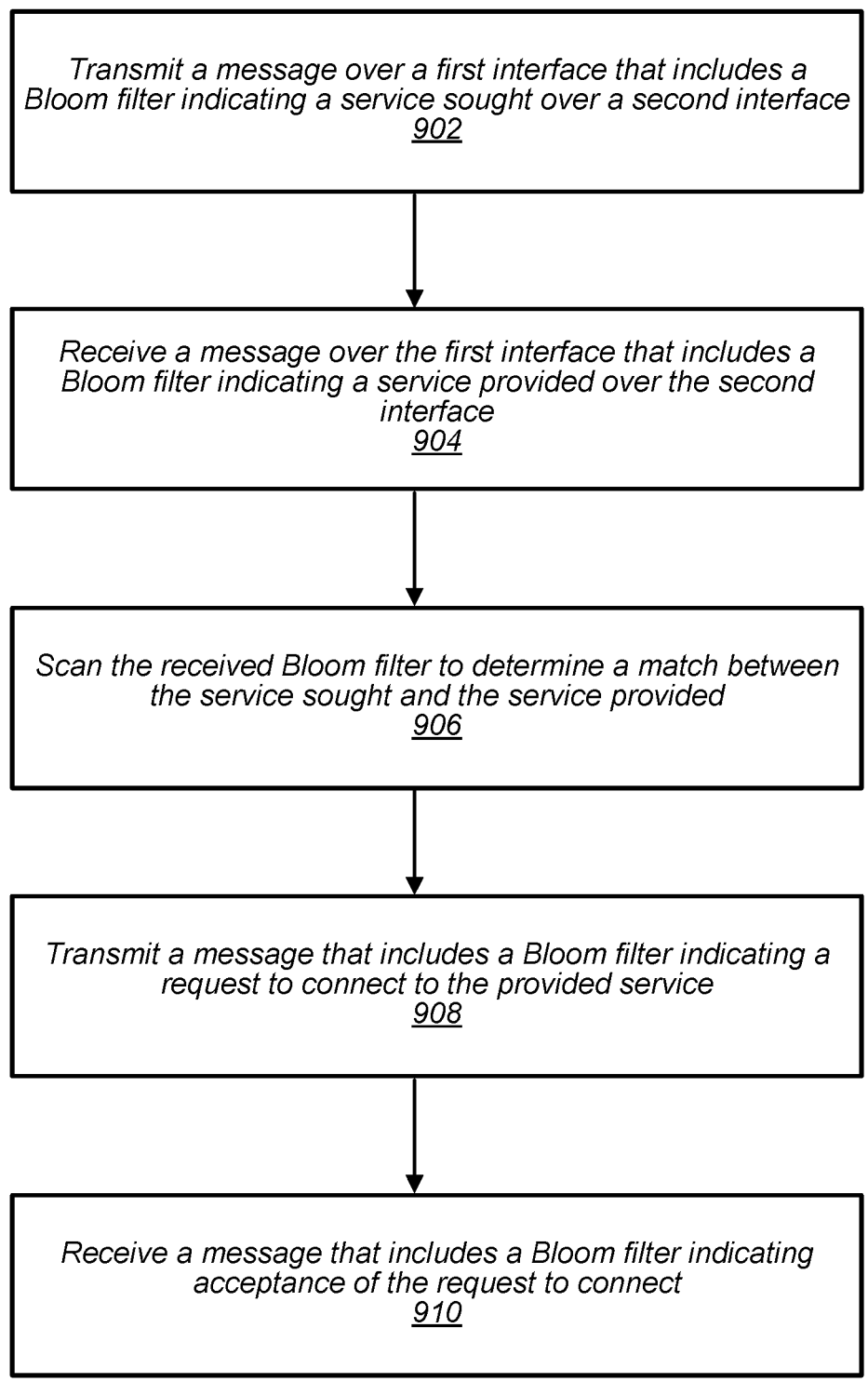
FIG. 9 illustrates a block diagram of an example of a method for triggering service discovery, according to some embodiments.

FIG. 9 illustrates a block diagram of an example of a method for triggering service discovery, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a message may be transmitted, by a client station such as client station 106, to a neighboring client station over a first interface. The message may include a Bloom filter that may indicated a service sought over a second interface. In some embodiments, the Bloom filter may include at least one service (or one or more services) provided by the client station. In some embodiments, the Bloom filter may be at least 8 bytes. The first interface may be a lower power interface (e.g., such as a Bluetooth, Bluetooth Low Energy, ZigBee, or an ultra-wideband radio interface) and the second interface may be a higher power interface (e.g., such as a Neighbor Awareness Networking (NAN) interface, a Wi-Fi Direct interface, an Apple Wireless Direct Link (AWDL) interface, a WiGig interface, a Wi-Fi Halow interface, an Infrastructure Wi-Fi interface and so forth). In some embodiments, the message may include (or be) a transport discovery service (TDS) packet. In some embodiments, the Bloom filter may be included in an organizational data field of the TDS packet.

In some embodiments, the Bloom filter may contain a set of bit positions that are set to "1" after hashing elements by the Bloom filter. In some embodiments, an element which may include a service type, a link identifier, and/or a type of operation may be defined using a standardized syntax, e.g., as described above. In some embodiments, an operation may include any of a device specific notification, a provider of a service, and/or a seeker of a service. In some embodiments, such a device specific notification may be advertised by a seeker of a service when the seeker wants to bring up (e.g., activate) a link on a device associated with the address. In some embodiments, a service type may be found in the Service Name and Transport Protocol Port Number registry. In other words, in some embodiments, services hashed by a Bloom filter as described above may conform to naming rules specified in Section 5 of RFC-6335 with an additional prefix for the type of operation being performed (e.g. seeking and/or providing) and a suffix for the type of link. In addition, the string may be lowercase and may not include a trailing dot. In some embodiments, prefixes and suffixes may aid in avoidance of false positives when a device is performing multiple operations at once (e.g. seeking and providing). In some embodiments, a suffix/link identifier may be a generic link identifier syntax that may represent a specific wireless technology. For example, "% nan" may represent Wi-Fi Aware (e.g., Neighbor Awareness Networking (NAN) peer-to-peer Wi-Fi link), "% p2p" may represent Wi-Fi Direct, "%60 ghz" may represent WiGig, "% iwifi" may represent Infrastructure Wi-Fi, "% halow" may represent Wi-Fi Halow, "% awdl" may represent Apple Wireless Direct Link (e.g., a peer-to-peer Wi-Fi link), "% btc" may represent Bluetooth classic. In some embodiments, the "% btc identifier may allow a lower power BLE link to activate (bring up) a higher performance (e.g., higher power) link.

At 904, a message may be received, by the client station, from the neighboring client station over the first interface. The message may include a Bloom filter indicating at least one service provided by the neighboring client station over the second interface. In some embodiments, the Bloom filter may indicate a plurality of services provided by the neighboring client station over the second interface. In some embodiments, the Bloom filter may include at least one service (or one or more services) sought by the neighboring client station. In some embodiments, the Bloom filter may be at least 8 bytes. In some embodiments, the message may include (or be) a transport discovery service (TDS) packet. In some embodiments, the Bloom filter may be included in an organizational data field of the TDS packet.

At 906, the received Bloom filter may be scanned (or searched) to determine a match between the service sought by the client station and a service provided by the neighboring client station.

At 908, a message may be transmitted, by the client station, to the neighboring client station requesting to connect to a service provided by the neighboring client station, e.g., based on the match between the service sought by the client station and the service provided by the neighboring client station. The message by be transmitted over the first interface. The request to connect may be indicated by a Bloom filter included in the message. In some embodiments, the Bloom filter may be at least 8 bytes. In some embodiments, the message may include (or be) a transport discovery service (TDS) packet. In some embodiments, the Bloom filter may be included in an organizational data field of the TDS packet.

At 910, a message may be received from the neighboring client station indicating acceptance of the request to connect to the provided service. The message may be received by the client station over the first interface. The acceptance of the request to connect may be indicated by a Bloom filter included in the message. In some embodiments, the message may include (or be) a transport discovery service (TDS) packet. In some embodiments, the Bloom filter may be included in an organizational data field of the TDS packet. In some embodiments, the Bloom filter may be at least 8 bytes.

In some embodiments, in response to receiving the acceptance of the request to connect, the client station may activate the second interface. In some embodiments, the client station may perform service discovery with the neighboring client station via the activated second interface. In some embodiments, the service discovery may be performed via a peer-to-peer protocol such as NAN, AWDL, or Wi-Fi Direct, among other peer-to-peer protocols.

Figure 10:
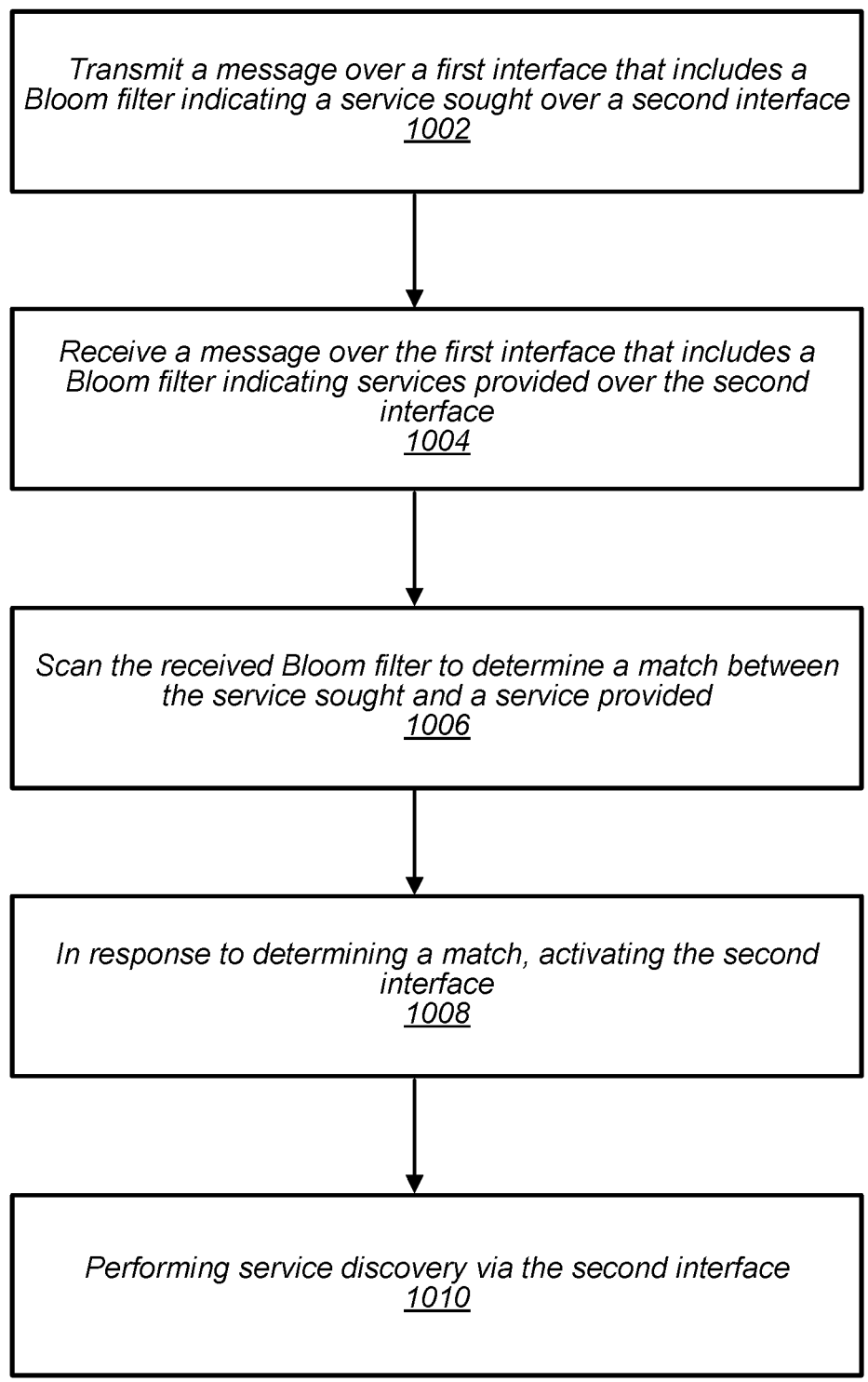
FIG. 10 illustrates a block diagram of another example of a method for triggering service discovery, according to some embodiments.

FIG. 10 illustrates a block diagram of another example of a method for triggering service discovery, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a message may be transmitted, by a client station such as client station 106, to a neighboring client station over a first interface. The message may include a Bloom filter that may indicated a service sought over a second interface. In some embodiments, the Bloom filter may include at least one service (or one or more services) provided by the client station. In some embodiments, the Bloom filter may be at least 8 bytes. The first interface may be a lower power interface (e.g., such as a Bluetooth, Bluetooth Low Energy, ZigBee, or an ultra-wideband radio interface) and the second interface may be a higher power interface (e.g., such as a Neighbor Awareness Networking (NAN) interface, a Wi-Fi Direct interface, an Apple Wireless Direct Link (AWDL) interface, a WiGig interface, a Wi-Fi Halow interface, an Infrastructure Wi-Fi interface and so forth). In some embodiments, the message may include (or be) a transport discovery service (TDS) packet. In some embodiments, the Bloom filter may be included in an organizational data field of the TDS packet.

In some embodiments, the Bloom filter may contain a set of bit positions that are set to "1" after hashing elements by the Bloom filter. In some embodiments, an element which may include a service type, a link identifier, and/or a type of operation may be defined using a standardized syntax, e.g., as described above. In some embodiments, an operation may include any of a device specific notification, a provider of a service, and/or a seeker of a service. In some embodiments, such a device specific notification may be advertised by a seeker of a service when the seeker wants to bring up (e.g., activate) a link on a device associated with the address. In some embodiments, a service type may be found in the Service Name and Transport Protocol Port Number registry. In other words, in some embodiments, services hashed by a Bloom filter as described above may conform to naming rules specified in Section 5 of RFC-6335 with an additional prefix for the type of operation being performed (e.g. seeking and/or providing) and a suffix for the type of link. In addition, the string may be lowercase and may not include a trailing dot. In some embodiments, prefixes and suffixes may aid in avoidance of false positives when a device is performing multiple operations at once (e.g. seeking and providing). In some embodiments, a suffix/link identifier may be a generic link identifier syntax that may represent a specific wireless technology. For example, "% nan" may represent Wi-Fi Aware (e.g., Neighbor Awareness Networking (NAN) peer-to-peer Wi-Fi link), "% p2p" may represent Wi-Fi Direct, "%60 ghz" may represent WiGig, "% iwifi" may represent Infrastructure Wi-Fi, "% halow" may represent Wi-Fi Halow, "% awdl" may represent Apple Wireless Direct Link (e.g., a peer-to-peer Wi-Fi link), "% btc" may represent Bluetooth classic. In some embodiments, the "% btc identifier may allow a lower power BLE link to activate (bring up) a higher performance (e.g., higher power) link.

At 1004, a message may be received, by the client station, from the neighboring client station over the first interface. The message may include a Bloom filter indicating a plurality of services provided by the neighboring client station over the second interface. In some embodiments, the Bloom filter may include at least one service (or one or more services) sought by the neighboring client station. In some embodiments, the Bloom filter may be at least 8 bytes. In some embodiments, the message may include (or be) a transport discovery service (TDS) packet. In some embodiments, the Bloom filter may be included in an organizational data field of the TDS packet.

At 1006, the received Bloom filter may be scanned (or searched) to determine a match between the service sought by the client station and a service provided by the neighboring client station.

At 1008, in response to determining a match, the client station may activate the second interface.

At 1010, the client station may perform service discovery with the neighboring client station via the activated second interface. In some embodiments, the service discovery may be performed via a peer-to-peer protocol such as NAN, AWDL, or Wi-Fi Direct, among other peer-to-peer protocols.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   a plurality of wireless interfaces in communication with the at least one antenna; and
   at least one processor in communication with the plurality of wireless interfaces;
   wherein the at least one processor is configured to cause the wireless station to:
      transmit, via a first wireless interface of the plurality of wireless interfaces, a first message to a neighboring wireless station, wherein the first message comprises a first Bloom filter indicating at least one service sought via at least one second wireless interface of the plurality of wireless interfaces;
      receive, via the first wireless interface, a second message from the neighboring wireless station, wherein the second message comprises a second Bloom filter indicating at least one service provided by the neighboring wireless station via the at least one second wireless interface;
      scan the second Bloom filter to determine a match between the at least one service sought and the at least one service provided over the at least one second wireless interface; and
      transmit, via the first wireless interface and in response to determining the match, a third message that comprises a third Bloom filter indicating a request to connect to the at least one service provided, wherein at least one of the first message, second message, or third message is formatted according to the transport discovery service packet format, and wherein at least one of the first Bloom filter, the second Bloom filter, or the third Bloom filter is included in an organization data field.

2. The wireless station of claim 1,
wherein the at least one processor is further configured to:
   receive, via the first wireless interface, a fourth message that comprises a fourth Bloom filter indicating acceptance of the request to connect to the at least one service provided.

3. The wireless station of claim 2,
wherein the at least one processor is further configured to cause the wireless station to:
   in response to receiving the fourth message, activate the at least one second wireless interface; and
   perform service discovery with the neighboring wireless station via the at least one second wireless interface.

4. The wireless station of claim 1,
wherein the first Bloom filter further includes at least one service provided by the wireless station via the at least one second wireless interface.

5. The wireless station of claim 1,
wherein the second Bloom filter further includes at least one service sought by the neighboring wireless station via the at least one second wireless interface.

6. The wireless station of claim 1,
wherein the first wireless interface comprises at least one of a Bluetooth interface, a Bluetooth Low Energy interface, a ZigBee interface, or an ultra-wideband radio interface; and
wherein the at least one second wireless interface comprises at least one of a Neighbor Awareness Networking interface, a Wi-Fi Direct interface, an Apple Wireless Direct Link interface, a WiGig interface, a Wi-Fi Halow interface, or an Infrastructure Wi-Fi interface.

7. The wireless station of claim 1,
wherein the first Bloom filter comprises at least 8 bytes.

8. An apparatus, comprising:
a memory; and
at least one processor in communication with the memory and first and second wireless interfaces, wherein the at least one processor is configured to:
   generate instructions to transmit, via the first wireless interface, a first transport discovery service (TDS) packet to a peer device, wherein the first TDS packet includes a first version of a Bloom filter indicating at least one service sought via the second wireless interface;
   receive, via the first wireless interface, a second TDS packet from the peer device, wherein the second TDS packet includes a second version of the Bloom filter, wherein the second version of the Bloom filter indicates a service provided by the peer device via the second wireless interface;
   scan the second version of the Bloom filter to determining a match between the at least one service sought and the at least one service provided; and
   generate instructions to transmit, in response to determining the match, a third TDS packet to the peer device, wherein the third TDS packet includes a third version of the Bloom filter that indicates a request to connect to the at least one service provided wherein at least one of the first version of the Bloom filter, the second version of the Bloom filter, or the third version of the Bloom filter is included in an organization data field.

9. The apparatus of claim 8,
wherein the at least one processor is further configured to:
   receive, via the first wireless interface, a fourth TDS packet from the peer device, wherein the fourth TDS packet includes a fourth version of the Bloom filter, and wherein the version of the Bloom filter indicates acceptance of the request to connect to the at least one service provided;
   in response to receiving the fourth TDS packet, generate instructions to activate the second wireless interface; and
   perform service discovery with the peer device via the second wireless interface.

10. The apparatus of claim 8,
wherein the first version of the Bloom filter further indicates at least one service provided by the apparatus via the second wireless interface.

11. The apparatus of claim 8,
wherein the second version of the Bloom filter further indicates at least one service sought by the peer device via the second wireless interface.

12. The apparatus of claim 8,
wherein the Bloom filter comprises at least 8 bytes.

13. The apparatus of claim 8,
wherein the first wireless interface comprises at least one of a Bluetooth interface, a Bluetooth Low Energy interface, a ZigBee interface, or an ultra-wideband radio interface.

14. The apparatus of claim 8,
wherein the second wireless interface comprises at least one of a Neighbor Awareness Networking interface, a Wi-Fi Direct interface, an Apple Wireless Direct Link interface, a WiGig interface, a Wi-Fi Halow interface, or an Infrastructure Wi-Fi interface.

15. A non-transitory computer readable memory medium storing program instructions executable by processing circuitry to cause a wireless station to:
   transmit, via a first wireless interface of a plurality of wireless interfaces, a first message to a neighboring wireless station, wherein the first message comprises a first Bloom filter indicating at least one service sought via at least one second wireless interface of the plurality of wireless interfaces;
   receive, via the first wireless interface, a second message from the neighboring wireless station, wherein the second message comprises a second Bloom filter indicating at least one service provided by the neighboring wireless station via the at least one second wireless interface;
   scan the second Bloom filter to determine a match between the at least one service sought and the at least one service provided over the at least one second wireless interface; and
   transmit, via the first wireless interface and in response to determining the match, a third message that comprises a third Bloom filter indicating a request to connect to the at least one service provided, wherein at least one of the first message, second message, or third message is formatted according to the transport discovery service packet format, and wherein at least one of the first Bloom filter, the second Bloom filter, or the third Bloom filter is included in an organization data field.

16. The non-transitory computer readable memory medium of claim 15,
wherein the program instructions are further executable by processing circuitry to cause the wireless station to:
   receive, via the first wireless interface, a fourth message that includes a fourth Bloom filter indicating acceptance of the request to connect to the at least one service provided;

activate the second wireless interface in response to receiving the fourth message; and perform service discovery with the neighboring wireless station via the second wireless interface.

17. The non-transitory computer readable memory medium of claim 15, wherein the first wireless interface is a lower power wireless interface than the at least one second wireless interface.

18. The non-transitory computer readable memory medium of claim 15, wherein the first Bloom filter further includes at least one service provided by the wireless station via the at least one second wireless interface.

19. The non-transitory computer readable memory medium of claim 15, wherein the second Bloom filter further includes at least one service sought by the neighboring wireless station via the at least one second wireless interface.

20. The non-transitory computer readable memory medium of claim 15, wherein the first Bloom filter comprises at least 8 bytes.

\* \* \* \* \*